(12) United States Patent
Ingvalson et al.

(10) Patent No.: US 8,917,203 B2
(45) Date of Patent: Dec. 23, 2014

(54) MOTION-BASED ADAPTIVE FREQUENCY ESTIMATION OF A DOPPLER VELOCITY SENSOR

(75) Inventors: Ryan Ingvalson, Saint Michael, MN (US); Robert C. McCroskey, Burnsville, MN (US); Wesley J. Hawkinson, Chanhassen, MN (US)

(73) Assignee: Honeywell International Inc., Morristown, NJ (US)

( * ) Notice: Subject to any disclaimer, the term of this patent is extended or adjusted under 35 U.S.C. 154(b) by 737 days.

(21) Appl. No.: 13/164,889

(22) Filed: Jun. 21, 2011

(65) Prior Publication Data

US 2012/0326918 A1 Dec. 27, 2012

(51) Int. Cl.
*G01S 13/08* (2006.01)
*G01C 21/10* (2006.01)
*G01C 21/16* (2006.01)

(52) U.S. Cl.
CPC .............. *G01C 21/10* (2013.01); *G01C 21/165* (2013.01)
USPC ........................................ 342/104

(58) Field of Classification Search
CPC ........ G01S 13/60; G01S 13/92; G01S 13/583
USPC .......................................................... 342/104
See application file for complete search history.

(56) References Cited

U.S. PATENT DOCUMENTS

| | | | | |
|---|---|---|---|---|
| 3,432,856 A | * | 3/1969 | Buell et al. | 342/61 |
| 3,702,477 A | * | 11/1972 | Brown | 342/451 |
| 4,414,548 A | * | 11/1983 | Carpenter et al. | 342/117 |
| 6,496,787 B1 | * | 12/2002 | Flentov et al. | 702/150 |
| 7,599,678 B2 | * | 10/2009 | Fisher | 455/323 |
| 2005/0128127 A1 | * | 6/2005 | Tevs et al. | 342/28 |

* cited by examiner

*Primary Examiner* — Frank J McGue
(74) *Attorney, Agent, or Firm* — Fogg & Powers LLC

(57) ABSTRACT

A system and method for motion-based adaptive frequency estimation of a Doppler sensor is provided. The system comprises a Doppler sensor configured to output a digitized Doppler data signal, and a Doppler velocity estimation module operatively coupled to the Doppler sensor to receive the Doppler data signal. An inertial navigation system is operatively coupled to the Doppler velocity estimation module, and one or more inertial sensors is operatively coupled to the inertial navigation system. The inertial sensors are configured to transmit inertial navigation data to the inertial navigation system. The Doppler velocity estimation module calculates a speed or velocity estimate based on the Doppler data signal and the inertial navigation data. The speed or velocity estimate is then transmitted to the inertial navigation system.

20 Claims, 4 Drawing Sheets

MOTION-BASED ADAPTIVE FREQUENCY ESTIMATION OF A DOPPLER VELOCITY SENSOR

STATEMENT REGARDING FEDERALLY SPONSORED RESEARCH OR DEVELOPMENT

This invention was made with Government support under N10PC20002 awarded by Department of Interior/Department of Homeland Security. The Government has certain rights in the invention.

BACKGROUND

Doppler sensors can be used to measure the relative speed between the sensor and a distant surface. This measurement is performed by projecting energy of a known frequency on the distant surface and comparing the returned energy frequency to the known frequency and inferring a speed based on the difference. To estimate the speed, a Doppler frequency shift is measured by estimating the frequency of the Doppler sensor output using a fast Fourier transform (FFT) or other estimation techniques, all of which require data collected over a fixed period of time.

A preferred output from a Doppler sensor is a speed measurement that is representative of a single instant in time, but this is physically impossible because frequency estimation requires a data sample collected in a time interval with non-zero length. Nevertheless, in near-constant relative speed environments, accurate measurements are possible. This is because constant relative speeds lead to continuous-time Doppler data with spectral density functions that are line spectra, and this is a fundamental assumption in most frequency estimation techniques. In dynamic environments, however, any relative speed change within the sample window will cause ambiguity in the frequency measurement due to the continuum of speeds present, which will cause the spectral density functions of the continuous-time Doppler data to take on a region of finite bandwidth. As a result, the spectral density function estimates of discretized Doppler data may have additional undesired effects due to leakage power or smearing bandwidth, which is dependent upon the discrete-data windowing function, the sample rate, and the underlying continuous-time spectral density function.

Typical Doppler implementations use a set of fixed algorithm parameters, designed to optimize measurement accuracy for a specific set of conditions, such as the case of continuous-time line spectra. When the frequency estimation techniques of the Doppler measurement algorithms are used outside of their designed conditions, measurement errors can occur.

SUMMARY

A system and method for motion-based adaptive frequency estimation of a Doppler sensor is provided. The system comprises a Doppler sensor configured to output a digitized Doppler data signal, and a Doppler velocity estimation module operatively coupled to the Doppler sensor to receive the Doppler data signal. An inertial navigation system is operatively coupled to the Doppler velocity estimation module, and one or more inertial sensors is operatively coupled to the inertial navigation system. The inertial sensors are configured to transmit inertial navigation data to the inertial navigation system. The Doppler velocity estimation module calculates a speed or velocity estimate based on the Doppler data signal and the inertial navigation data. The speed or velocity estimate is then transmitted to the inertial navigation system.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
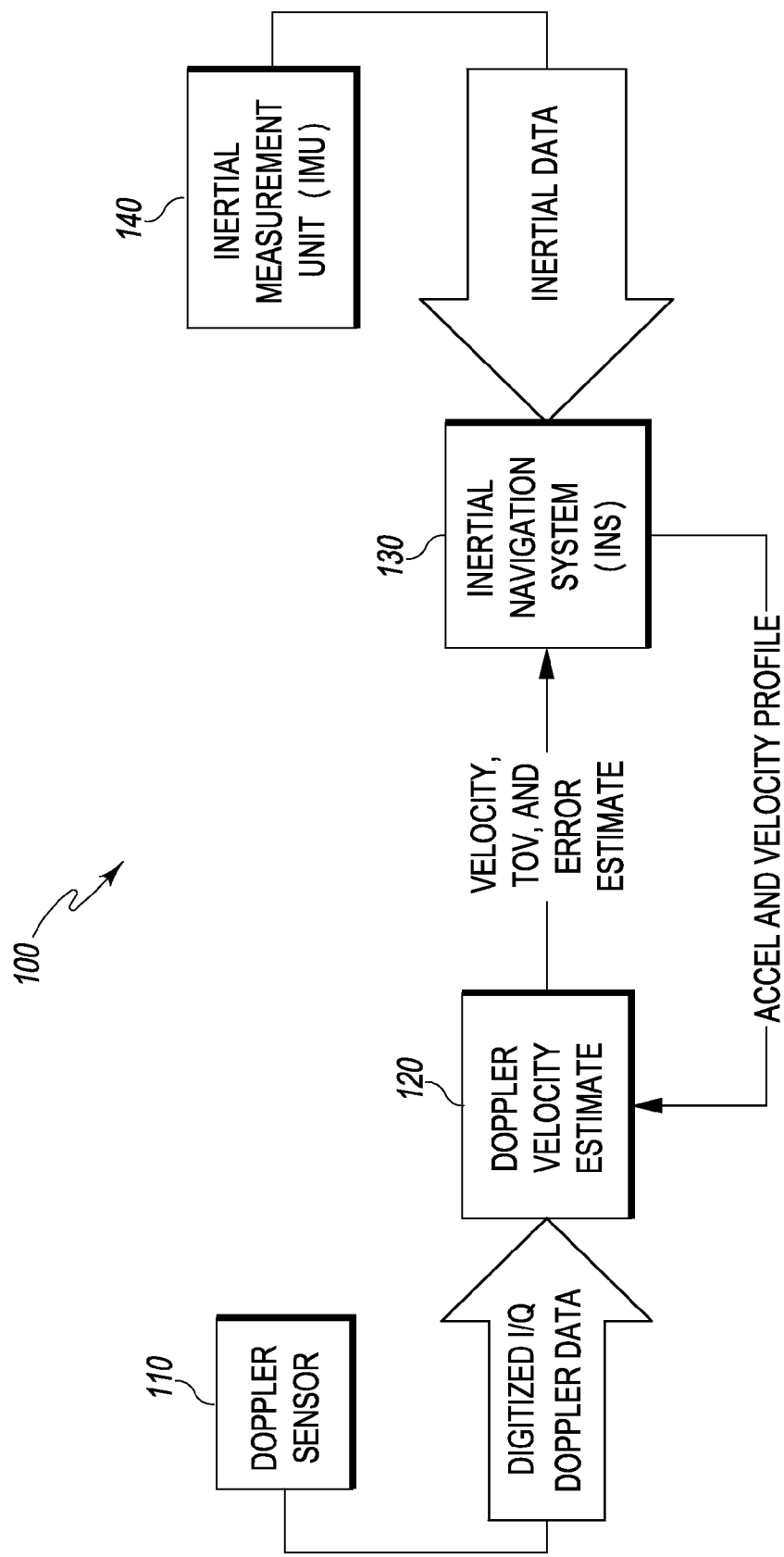
FIG. 1 is a block diagram showing a general overview of a system for motion-based adaptive frequency estimation according to one embodiment.

In the following detailed description, reference is made to the accompanying drawings in which is shown by way of example specific illustrative embodiments. It is to be understood that other embodiments may be utilized and that mechanical and electrical changes may be made. The following detailed description is, therefore, not to be taken in a limiting sense.

A method and system are provided for motion-based adaptive frequency estimation of a Doppler sensor, such as a continuous-wave Doppler velocity sensor. The method and system provide significant navigation performance improvement via better velocity aiding. The present approach improves the accuracy of a Doppler sensor when integrated with one or more inertial sensors as part of an inertial navigation system (INS).

In the present approach, a Doppler speed measurement is improved by measuring the change in speed at the Doppler sensor during a measurement period using an external sensor device. The external sensor device can be any sensor that is capable of measuring acceleration or velocity along the Doppler sensor input axis. For example, a single accelerometer mounted along the Doppler sensor's sensitive axis is sufficient. In another embodiment, the external sensor device can include a combination of inertial sensors such as accelerometers and gyroscopes. For example, an inertial measurement unit (IMU) can be employed, which includes a combination of accelerometers and gyroscopes.

A physically coupled inertial sensor such as an IMU provides acceleration information to an appropriate algorithm, which can be designed to compute the speed change that the Doppler sensor will observe over the measurement period. The speed change information can be used to reduce the Doppler speed measurement errors using two methods. One method of reducing measurement errors is to constrain the data sample to measurement periods that correspond to low or constant acceleration. Another method is to use the change in speed information to adjust the parameters of a frequency estimation algorithm to more accurately, and with less ambiguity, measure the average frequency in the data window. Since the speed measurement of a Doppler sensor is directly proportional to the frequency measurement, improvements in the frequency measurement directly result in an improved speed measurement.

The present approach uses a feedback system to provide short-term velocity and acceleration data from the inertial sensor to a Doppler speed/velocity estimation module. This data is used in several unique ways: (1) select data from the Doppler sensor that corresponds to a period of low or constant velocity rate-of-change (acceleration); (2) optimize frequency estimating algorithm parameters for a selected velocity profile—for example, this could be the number of data points used in a fast Fourier transform (FFT), or the number of zeros padded to the data; (3) estimate the error on the speed estimate based on the input velocity profile and the selected algorithm parameters.

The present method can be implemented in a software-based algorithm, and thus may be implemented on both hardware and simulation based platforms provided the algorithm has access to the specified input data and the necessary computational resources The present technique can be implemented in personal navigation systems that use Doppler sensors. For example, the present technique can be implemented in emergency responder tracking systems such as used by firefighters, police, etc., and in military or civilian personal navigation systems.

FIG. 1 is a block diagram showing a general overview of a system 100 for motion-based adaptive frequency estimation according to one embodiment. A Doppler sensor 110 is operatively coupled to Doppler velocity estimation module 120, which is operatively coupled to an INS 130. An inertial sensor 140 such as an IMU is operatively coupled to INS 130.

During operation of system 100, Doppler velocity estimation module 120 receives digitized Doppler data, such as in-phase and quadrature-phase (I/Q) Doppler data, from Doppler sensor 110. The INS 130 receives inertial data (e.g., IMU data), such as acceleration and velocity data, from inertial sensor 140. The INS 130 also receives velocity, measurement time-of-validity (TOV), and optional error estimates from Doppler velocity estimation module 120. The INS 130 in turn feeds back acceleration and velocity profile data to Doppler velocity estimation module 120.

Figure 2:
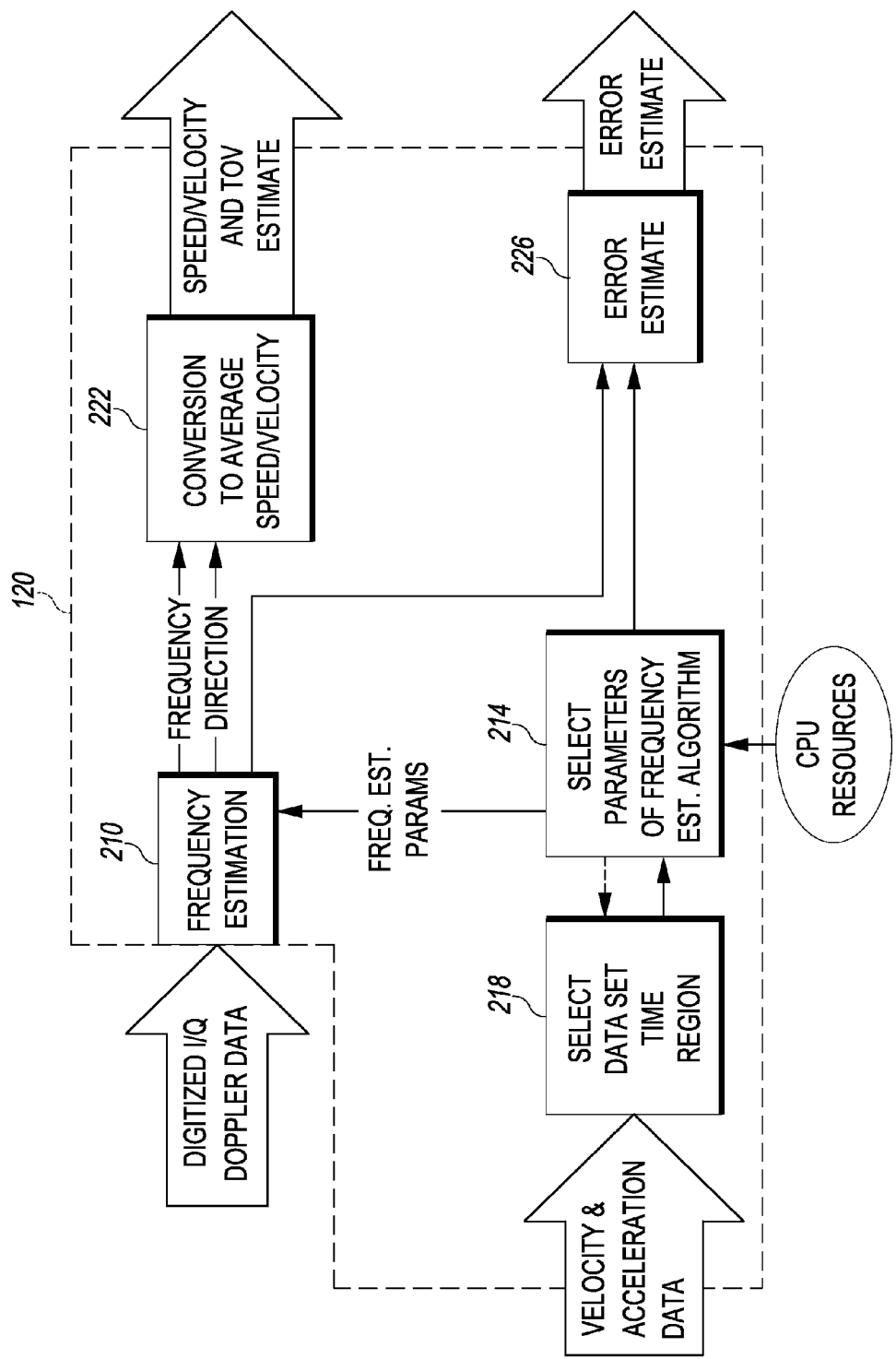
FIG. 2 is a block diagram showing further details of the system of FIG. 1.

FIG. 2 is a block diagram showing further details of Doppler velocity estimation module 120 of FIG. 1. As illustrated in FIG. 2, a frequency estimation block 210 receives digitized I/Q Doppler input data from a Doppler sensor (not shown). The frequency estimation block 210 also receives frequency estimation parameters from an algorithm parameter selection block 214, which can utilize processor (e.g., CPU) resources as needed. The frequency estimation block 210 computes an estimated frequency based on the Doppler input data and the frequency estimation parameters from block 214. The frequency estimation parameters can include the number of data points and the length of zero-padding.

A speed/velocity estimation block 222 estimates the average speed, or average velocity if desired, based on frequency data, or frequency and direction data, output from block 210. Since the speed measurement is directly proportional to the Doppler frequency, block 222 contains a scaling factor for converting a frequency to a speed, and logic for the sign of the speed based on a direction indicator. The estimated average speed or velocity is output to an INS (not shown).

An optional error estimation block 226 estimates the total error in the speed or velocity estimate, and outputs an error estimate to the INS. Errors can be introduced through three primary ways: 1) inherent algorithm inaccuracies of the frequency estimation technique (e.g., for FFT: smearing and leakage); 2) motion-induced data errors (e.g., nonconstant acceleration); and 3) sensor errors (e.g., noise).

The block 210 may use any frequency estimation technique or algorithm, such as a Fast Fourier Transform (FFT) algorithm. The I/Q Doppler input data refers to the in-phase and quadrature-phase channels of the Doppler sensor output. These channels each contain the same frequency/speed information, but they differ in their in-phase relationship depending on the direction of the velocity relative to the Doppler sensor. Hence, I and Q are both necessary only if velocity estimation is required (velocity=speed and direction). If only speed estimation is required, either I or Q is minimally sufficient; however, even when velocity direction is not needed, it is desirable to compare the frequency estimates of both I and Q channels as a consistency check. When velocity direction is needed, block 210 operates on the raw I/Q data to infer the direction of the relative velocity observed by the Doppler sensor.

In parameter selection block 214, algorithms analyze the input acceleration and velocity profiles for data segments that will minimize errors in the frequency estimation of block 210. In general, the algorithms in block 214 find a maximal length data set with minimal acceleration change. However, the details of the algorithms in block 214 will depend upon the algorithms in block 210 and the computational constraints of the platform. For example, if block 210 includes an FFT, the frequency estimation accuracy is highly dependent upon identification of a peak in the power spectral density (PSD). Peak identification accuracy is directly related to the main lobe width of the FFT used to compute the PSD and the amount of leakage caused by the interaction of the data and the FFT. The leakage will be minimized on the condition that the main lobe width of the FFT (in terms of frequency) is larger than the frequency shift caused by the velocity change within the data window. The main lobe width is a function of the sample rate of the I/Q data and the number of data points. Additionally, finding the peak of the main lobe is refined and improved by zero-padding the I/Q data. In general, the more zero-padding the better, but that benefit is met by a trade-off between available computational resources and performance improvements. In the case of an FFT, the algorithms of block 214 will help optimize this trade-off, as well as in selecting the best data segment.

In addition, a data segment selection block 218 can be implemented separately from block 214 to provide a stand-alone function that selects a data segment (data set time region) with considerations only on the input velocity and acceleration data, according to some metric such as finding the segment with the lowest acceleration or with the most constant acceleration. Alternatively, block 218 may have constraints and/or requirements on the data selection "flow down" as inputs from parameter selection block 214. Depending upon the design, an iterative coupling between blocks 214 and 218 can be implemented, where blocks 214 and 218 need to converge onto the optimal data selection and algorithm parameters. When this is the case, block 214 and 218 are essentially merged together into a single block.

Figure 3A:
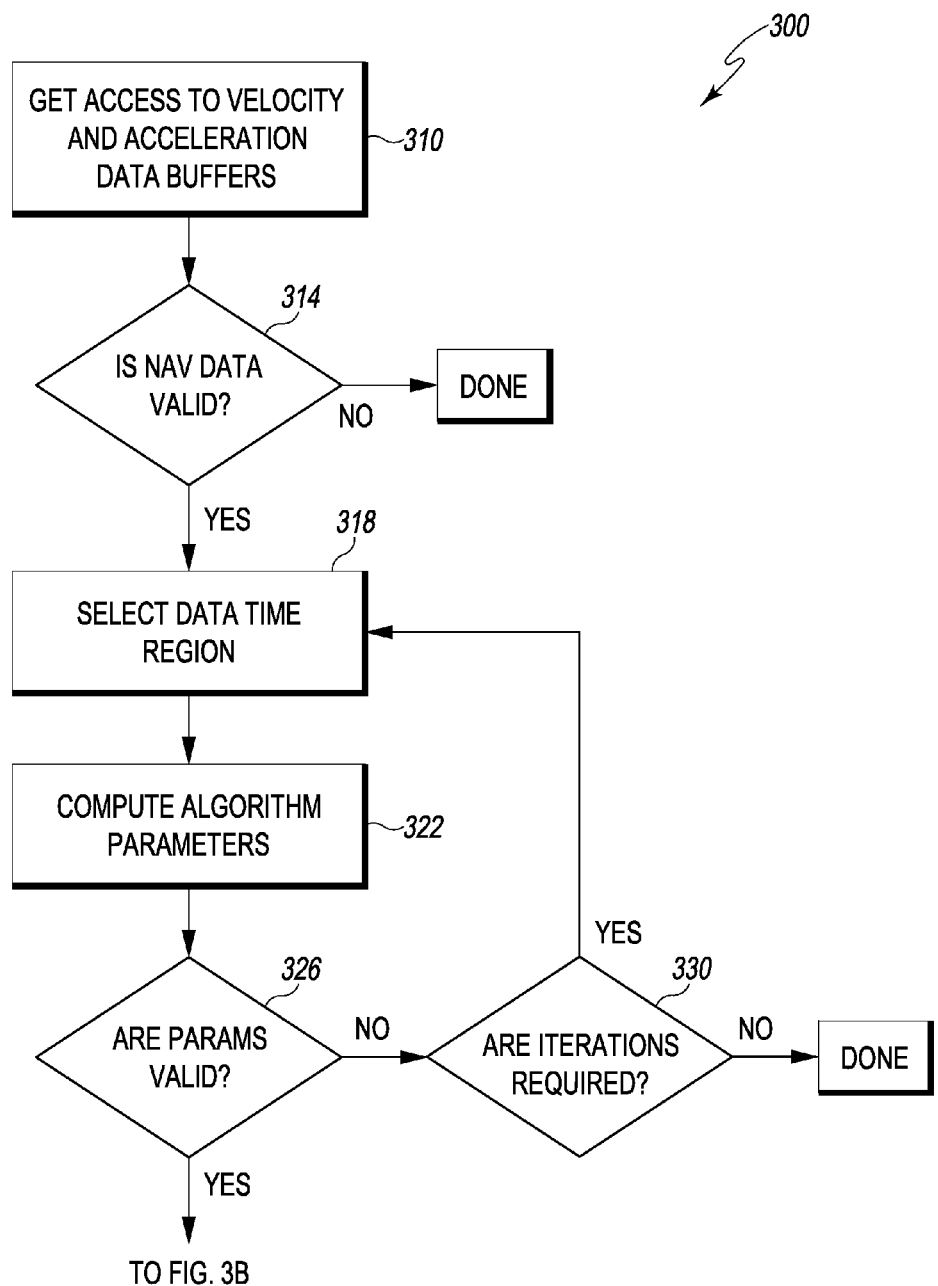
FIGS. 3A and 3B are flow diagrams of a method for motion-based adaptive frequency estimation of a Doppler sensor.
Figure 3B:
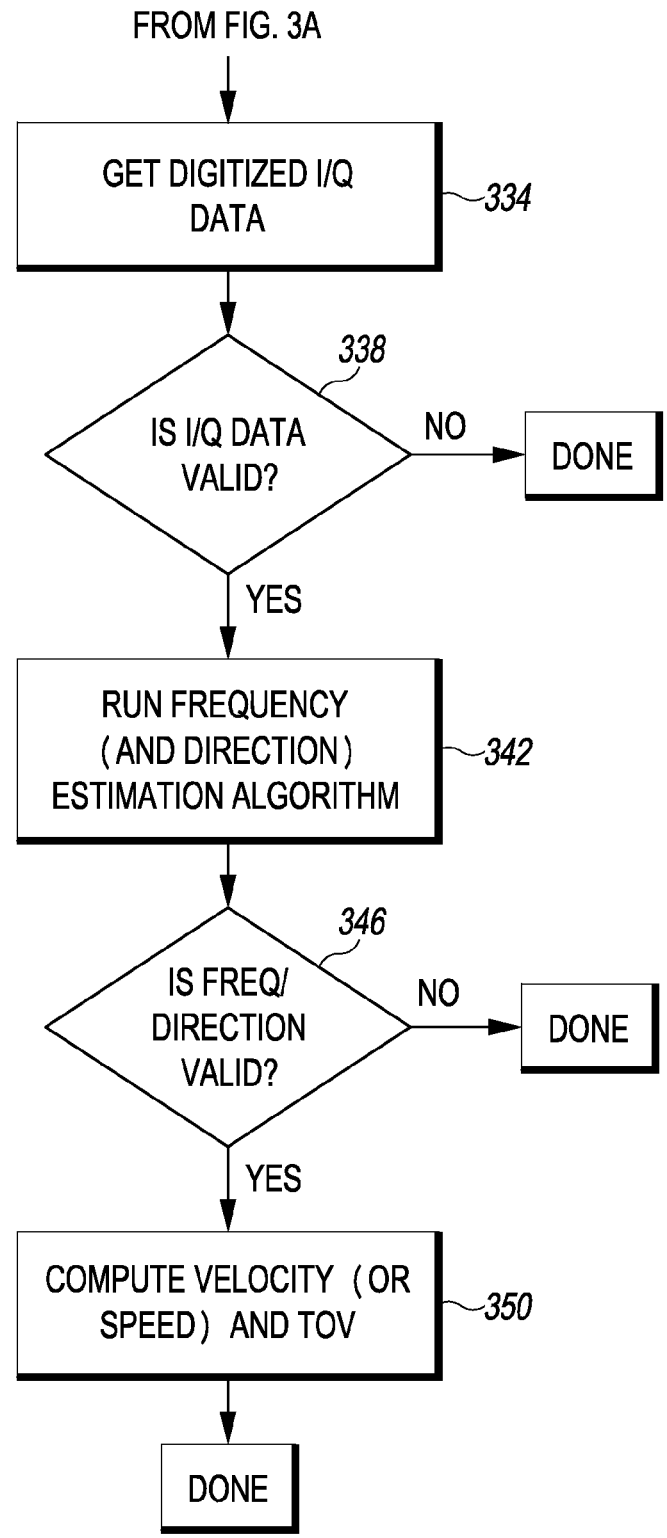

FIGS. 3A and 3B are flow diagrams of a method 300 for motion-based adaptive frequency estimation of a Doppler sensor. Initially, access is obtained to velocity and acceleration data buffers at 310, and a determination is made whether the velocity and acceleration (navigation) data is valid at 314. If the data is not valid, further processing cannot be completed and the method is done. If the data is valid, a data time region is selected at 318, and Doppler frequency estimation (algorithm) parameters are computed at 322. A determination is then made whether the parameters are valid at 326. If the parameters are not valid, a determination is made whether iterations are required at 330. If not, the method is done. If iterations are required, the method returns to 318 to select another data time region and continues to 326 to determine again whether the parameters are valid. If the parameters are valid, digitized I/Q Doppler data is obtained at 334, and a determination is made whether the I/Q Doppler data is valid at 338. If the I/Q data is not valid, the method is done. If the I/Q Doppler data is valid, a Doppler frequency estimate is calculated based on the Doppler data and the frequency estimation parameters using a frequency (and direction) estimation algorithm at 342. A determination is then made whether the Doppler frequency estimate (frequency/direction) is valid at 346. If not valid, the method is done. If frequency estimate is valid, the average speed or velocity estimate and TOV is computed based on the frequency estimate at 350, after which the method is done.

A processor for use in the present system can be implemented using software, firmware, hardware, or any appropriate combination thereof, as known to one of skill in the art. By way of example and not limitation, hardware components for the processor can include one or more microprocessors, memory elements, digital signal processing (DSP) elements, interface cards, and other standard components known in the art. Any of the foregoing may be supplemented by, or incorporated in, specially-designed application-specific integrated circuits (ASICs) or field programmable gate arrays (FPGAs). The processor includes or functions with software programs, firmware, or other computer readable instructions for carrying out various process tasks, calculations, and control functions, used in the present method. These instructions are typically tangibly embodied on any appropriate computer program product that includes a computer readable medium used for storage of computer readable instructions or data structures.

The present method can be implemented with any available computer readable storage media that can be accessed by a general purpose or special purpose computer or processor, or any programmable logic device. Suitable computer readable media may include storage or memory media such as magnetic or optical media. For example, storage or memory media may include conventional hard disks, Compact Disk—Read Only Memory (CD-ROM), DVDs, volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), and the like), Read Only Memory (ROM), Electrically Erasable Programmable ROM (EEPROM), flash memory, Blu-ray discs, and the like. Combinations of the above are also included within the scope of computer readable media.

The present methods can be implemented by computer executable instructions, such as program modules, which are executed by at least one processor. Generally, program modules include routines, programs, objects, data components, data structures, algorithms, and the like, which perform particular tasks or implement particular abstract data types.

Although specific embodiments have been illustrated and described herein, it will be appreciated by those of ordinary skill in the art that any arrangement, which is calculated to achieve the same purpose, may be substituted for the specific embodiments shown. The described embodiments are to be considered in all respects only as illustrative and not restrictive. The scope of the invention is therefore indicated by the following claims rather than by the foregoing description. All changes that come within the meaning and range of equivalency of the claims are to be embraced within their scope.

What is claimed is:

1. A system for motion-based adaptive frequency estimation of a Doppler sensor, the system comprising:
a Doppler sensor configured to output a digitized Doppler data signal;
a Doppler velocity estimation module operatively coupled to the Doppler sensor to receive the Doppler data signal;
an inertial navigation system configured to receive data output from the Doppler velocity estimation module;
one or more inertial sensors operatively coupled to the inertial navigation system and configured to transmit inertial data to the inertial navigation system; and
a feedback loop directly between the inertial navigation system and the Doppler velocity estimation module;
wherein the Doppler velocity estimation module calculates a speed or velocity estimate based on the Doppler data signal and navigation data that is transmitted directly to the Doppler velocity estimation module from the inertial navigation system in the feedback loop;
wherein the speed or velocity estimate is transmitted directly to the inertial navigation system from the Doppler velocity estimation module as part of the feedback loop.

2. The system of claim 1, wherein the Doppler velocity estimation module further calculates an error estimate for the speed or velocity estimate, and the error estimate is transmitted to the inertial navigation system.

3. The system of claim 1, wherein the Doppler data signal includes in-phase or quadrature-phase data.

4. The system of claim 1, wherein the inertial sensors are implemented in an inertial measurement unit.

5. The system of claim 1, wherein the Doppler velocity estimation module comprises a frequency estimation algorithm configured to receive the Doppler data signal, and a parameter selection block configured to transmit frequency estimation parameters to the frequency estimation algorithm.

6. The system of claim 5, wherein the frequency estimation algorithm is configured to compute an estimated frequency based on the Doppler data signal and the frequency estimation parameters.

7. The system of claim 5, wherein the frequency estimation parameters include number of data points and length of zero-padding.

8. The system of claim 5, wherein the Doppler velocity estimation module further comprises a speed/velocity estimation block configured to calculate an average speed based on frequency data, or an average velocity based on frequency data and direction data.

9. The system of claim 5, wherein the Doppler velocity estimation module further comprises an error estimation block configured to calculate total error in average speed or average velocity.

10. The system of claim 5, wherein the Doppler velocity estimation module further comprises a data segment selection block operatively coupled to the parameter selection block.

11. A method for motion-based adaptive frequency estimation of a Doppler sensor, the method comprising:
receiving a digitized Doppler data signal from the Doppler sensor in a Doppler velocity estimation module;
transmitting inertial data from an inertial measurement unit to an inertial navigation system;
transmitting inertial navigation data directly to the Doppler velocity estimation module from the inertial navigation system in a feedback loop;
determining Doppler frequency estimation parameters based on the inertial navigation data;
calculating a Doppler frequency estimate based on the Doppler data signal and the frequency estimation parameters;
calculating an average speed or velocity estimate based on the Doppler frequency estimate; and transmitting the average speed or velocity estimate directly to the inertial navigation system from the Doppler velocity estimation module as part of the feedback loop.

12. The method of claim 11, further comprising calculating an error estimate for the Doppler frequency estimate.

13. The method of claim 11, wherein the digitized Doppler data signal includes in-phase or quadrature-phase data.

14. The method of claim 11, wherein the digitized Doppler data includes in-phase and quadrature-phase data.

15. The method of claim 11, wherein the frequency estimation parameters include number of data points and length of zero-padding.

16. The method of claim 11, wherein the average speed is estimated by using a scaling factor to convert the estimated frequency to the average speed estimate.

17. The method of claim 11, wherein the average velocity is estimated by using a scaling factor to convert the estimated frequency to the average speed estimate, and determining a sign of the average speed estimate based on a direction indicator.

18. A computer program product, comprising:
a computer readable medium having instructions stored thereon executable by a processor to perform a method for motion-based adaptive frequency estimation of a Doppler sensor according to the method of claim 11.

19. A method for motion-based adaptive frequency estimation of a Doppler sensor, the method comprising:
(a) obtaining velocity and acceleration data from an inertial navigation system;
(b) determining whether the velocity and acceleration data is valid;
(c) when the velocity and acceleration data is valid, selecting a data time region and directing the velocity and acceleration data directly to the Doppler velocity estimation module from the inertial navigation system in a feedback loop;
(d) determining Doppler frequency estimation parameters based on the velocity and acceleration data;
(e) determining whether the frequency estimation parameters are valid;
(f) if the frequency estimation parameters are not valid, determining whether iterations are required;
(g) if the iterations are required, returning to (c) to select another data time region and repeating (d) and (e);
(h) if the frequency estimation parameters are valid, obtaining digitized Doppler data;
(i) determining whether the Doppler data is valid;
(j) if the Doppler data is valid, calculating a Doppler frequency estimate based on the Doppler data and the frequency estimation parameters;
(k) determining whether the Doppler frequency estimate is valid;
(l) if the Doppler frequency estimate is valid, calculating an average speed or velocity estimate based on the Doppler frequency estimate; and
(m) transmitting the average speed or velocity estimate directly to the inertial navigation system from the Doppler velocity estimation module as part of the feedback loop.

20. A computer program product, comprising:
a computer readable medium having instructions stored thereon executable by a processor to perform a method for motion-based adaptive frequency estimation of a Doppler sensor according to the method of claim 19.

* * * * *